United States Patent Office 2,790,416
Patented Apr. 30, 1957

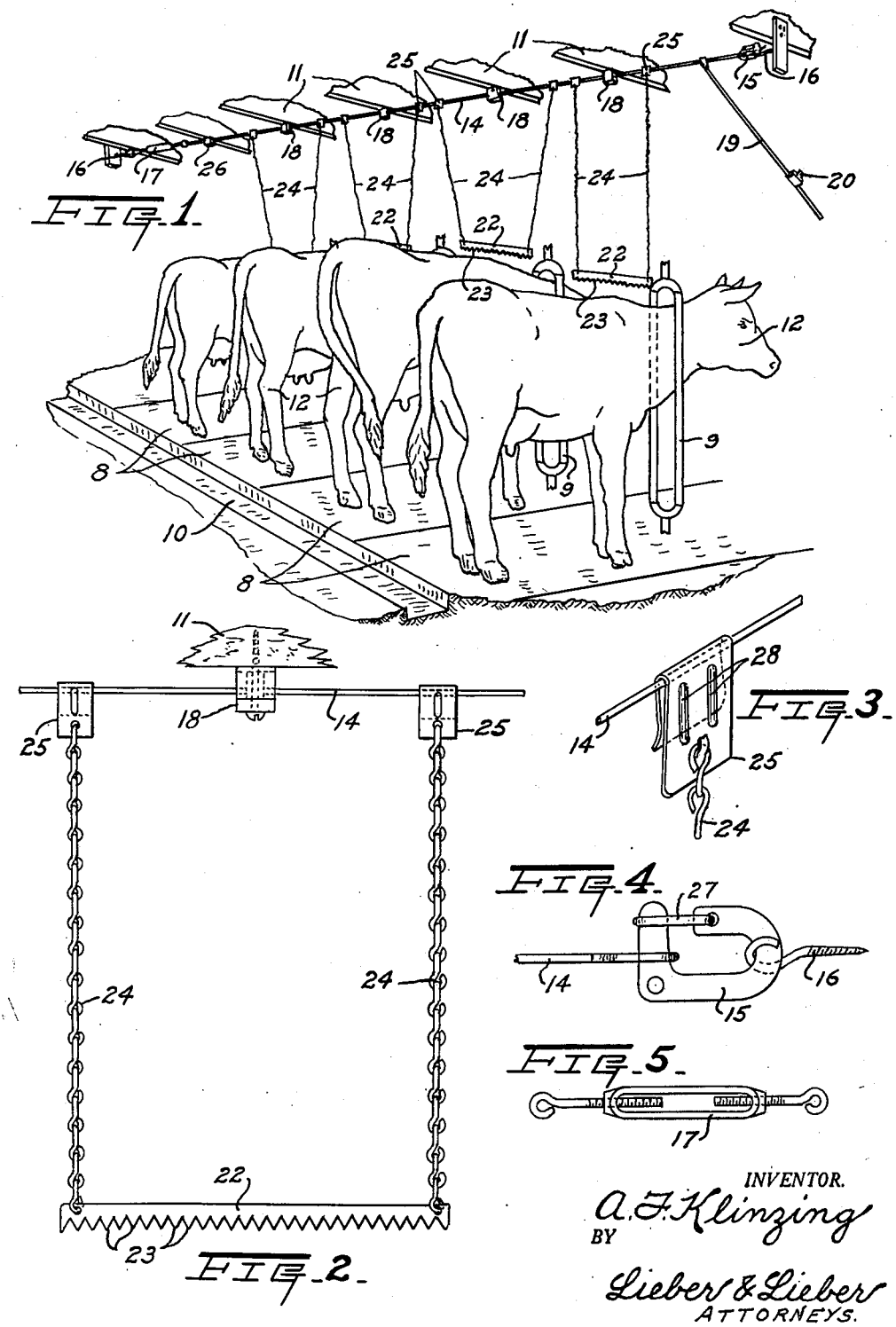

2,790,416
ANIMAL TRAINER
August F. Klinzing, St. Paul, Minn.

Application February 13, 1956, Serial No. 564,973

2 Claims. (Cl. 119—27)

The present invention relates generally to improvements in devices for facilitating the maintenance of sanitary conditions in animal housings, and relates more specifically to improvements in the construction and functioning of equipment for enabling cattle or the like to aid in keeping its stalls devoid of obnoxious debris.

The primary object of this invention is to provide simple and easily installable but highly effective equipment for training animals such as cows confined within stalls provided with rear debris collecting gutters, to deposit droppings into such gutters rather than within the adjacent stalls.

It is a well known fact that when animals such as cows while housed within their stalls are about to evacuate, they hunch their backs and move their haunches forwardly when their necks are confined within stanchions, thereby creating messy conditions within the adjacent stalls forwardly of the debris catching gutters usually provided rearwardly of the stalls. It is also a fact that such animals are extremely sensitive to electric shock and will quickly retract or withdraw from even a weak source of electric current such as a mildly charged wire fence.

These facts have heretofore led to the proposal of utilizing an electrical system wherein the cattle housing or barn is provided with a mildly charged electric wire located above the stalls, and a vertically adjustable contact member suspended from the wire is adapted to be contacted by the hunched backs of the cows during evacuation, so that the resultant shock will cause the animals to depress their backs and return to normal standing position whereby the droppings are deposited into the collecting gutter. While such system does in fact perform its intended function, the prior apparatus for exploiting the idea was far too complicated and difficult to install and to adjust so as to insure proper performance thereof.

It is therefore an important object of the present invention to provide an improved animal trainer based upon the foregoing facts and involving an electrical system, which is considerably simpler and more readily installable than any of the prior equipment of this general type.

Another important object of this invention is to provide an improved cattle training device comprising only a few simple but durable parts adapted to be manufactured at moderate cost and assembled for effective use by a novice.

A further important object of the invention is to provide a cow training assemblage which can be easily fitted for proper cooperation with animals of various heights without necessitating tedious vertical adjustment of parts of the equipment.

Still another important object of my invention is to provide an extremely sensitive and quick acting bovine trainer which is safely operable to effectively perform its function without endangering the animals affected thereby.

An additional important object of the present invention is to provide a highly efficient training system adapted to cooperate with animals of various kinds and sizes confined within stalls to maintain extremely sanitary conditions therein, and to thus insure healthy cattle.

These and other more specific objects and advantages of the invention will be apparent from the following detailed description.

A clear conception of the features constituting the present improvements, and of the construction, installation and functioning of a typical cow trainer embodying the invention, may be had by referring to the drawing accompanying and forming a part of this specification in which like reference characters designate the same or similar parts in the various views.

Fig. 1 is a relatively diagrammatic and fragmentary perspective view of a fragment of the interior of a cattle barn showing four cows confined within their stalls by stanchions, and which are provided with the improved animal training equipment suspended from overhead rafters of the building;

Fig. 2 is an enlarged rear plan view of one of the animal trainers applied to a fragment of the energizing and suspension wires, showing the contact bar in lowermost position;

Fig. 3 is a further enlarged perspective view of one of the contact bar suspension hooks showing the same applied to the energizing wire and provided with a fragment of one of the bar suspension chains;

Fig. 4 is a similarly enlarged plan view of one of the end insulators for supporting the energizing electric wire of the improved animal training system; and Fig. 5 is a likewise enlarged plan view of one of the charging wire supporting and tensioning turnbuckles.

While the invention has been illustrated and described herein as being advantageously applicable to barns having several stalls provided with stanchions especially adapted to confine dairy cows, it is not the intent to restrict the use of the improvement to such animal housings; and it is also contemplated that specific descriptive terms employed herein be given the broadest interpretation consistent with the actual disclosure.

Referring to the drawing, the typical cattle housing shown in Fig. 1, comprises in general a series of individual laterally adjacent stalls 8 each having its forward portion provided with an animal retaining stanchion 9 while all of their rear ends terminate in a common refuse collecting gutter 10, and a series of beams such as roof rafters or ceiling joists 11 disposed above the stalls 8. Each of the stalls 8 is ordinarily of sufficient width to be conveniently occupied by a cow 12 or similar animal, and the retaining stanchions 9 are so positioned with respect to the refuse receiving gutter 10 that when the confined animals are in normal posture during evacuation periods the droppings will fall into the gutter and will not descend onto the bedding usually covering the stall floors. However, whenever an animal such as a cow 12 proceeds to evacuate, it naturally raises or hunches its back and moves its hindquarters forwardly while its neck is confined within a stanchion 9, thus tending to cause the droppings to fall within the adjacent stall, and the present invention involves a trainer for causing such animals to maintain normal posture during evacuation.

In accordance with the present improvement, a bare electric current conductor or wire 14 is provided at one end with a supporting insulator 15 adapted to be secured to one of the overhead joists 11 in any suitable manner as by a screw hook 16, while its opposite end may be likewise secured to a remote joist 11 beyond the series of stalls 8 by means of a similar hook 16 coacting with an insulating turnbuckle 17 which may be manipulated to tension the wire 14. The medial portions of the stretched overhead wire 14 spanning all of the stalls 8 and located above the center of each stall, is also preferably suspended from an adjacent joist 11 by a line insulator 18; and a suitable portion of the bare wire 14 should also be electrically connected to a source of low voltage electric current such as a battery or an electric fence, through a conductor 19 having a cut-out switch 20 therein, all as shown in Fig. 1.

Locatable in rather close proximity to and adapted to span the back of each cow 12 occupying one of the stalls 8, is a current conducting bar 22 having a series of lower serrations forming contact points 23 of V-shape adapted to merely penetrate the animal's hairy coat, and the opposite ends of each of these bars 22 are preferably permanently but pivotally attached directly to the lower extremities of the bar suspension elements such as flexible chains 24 the upper ends of which are relatively movable along the charging wire 14 on opposite sides of an intervening line insulator 18. These chains 24 are also preferably formed of good current conducting metal, and in order to insure effective electrical connection between the upper chain ends and the wire 14 these chain ends are preferably pivotally attached to sheet metal suspension hooks 25 adapted to frictionally clamp but to be slid along the wire 14. The chains 24 of each complementary pair are preferably of equal length so that when they are in vertical parallel position as in Fig. 2 the suspended bar 22 will be disposed horizontally in lowermost position, but the corresponding hooks 25 from which these chains are suspended may be moved apart so as to incline the elongated suspension elements and to thereby raise the adjacent bar 22 to various heights as illustrated in Fig. 1.

The end insulator 15 and the bar suspension hooks 25 may be formed of sheet material with the aid of punches and dies, but the insulator 15 must be constructed of insulating material and should be provided with a wire release link 27; while the hooks 25 should be constructed of resilient current conducting material with two gripping beads 28 adapted to firmly frictionally clamp the wire 14. The screw hooks 16 may be of standard construction and the turnbuckle 17 may either be constructed of insulating material or of current conducting material but in the latter case an insulator 26 must be provided between the turnbuckle 17 and the adjacent end of the wire 14 as shown in Fig. 1. The chains 24 may be formed of ordinary metallic chain stock of any desired length, but these chains must also be constructed of current conducting material, and the line insulators 18 may be of any suitable construction capable of preventing grounding of wire 14. The bars 22 may also be sheet metal stampings, and the wire 14 should be bare and of sufficient strength to carry the bars 22 and their suspension elements, so that the entire trainer assemblage may be formed of readily available materials.

When the various elements of the improved animal trainer have been properly constructed and the current conducting wire 14 has been installed and connected to a source of electrical energy as hereinabove described, the chain and contact bar assemblages may be applied to the wire 14 so as to substantially span the several stalls 8. With the switch 20 in off position, the cows 12 may then be admitted to their stalls 8 and stanchions 9, whereupon the chains 24 of each contact unit may be positioned so as to dispose the corresponding contact bars 22 a few inches above the backs of the adjacent standing cows 12. The switch 20 may then be closed to energize the wire 14 and the bars 22 whereupon the system will be in operative condition. With the bars 22 thus positioned the cows 12 normally will not be contacted or annoyed by them, but if a cow for any reason should hunch or elevate its back so as to contact the adjacent bar 22 it will receive an electric shock and quickly return to normal standing posture. When the animals leave their stalls 8 the switch 20 may either be opened to de-energize the system, or it may be allowed to remain closed.

From the foregoing detailed description of the construction and functioning of the improved system, it should be apparent that the present invention in fact provides an animal trainer which besides being simple and readily installable, is highly effective in actual use. The entire assemblage may be produced at very moderate cost and installed by a novice to cooperate with cows or other animals of various heights, and the sharp contact points 23 formed by the serrations extending along the lower edges of the bars 22 provide better body contact for these bars since the V-shaped points 23 are capable of more effectively penetrating the layers of hair without piercing the animal's skin. The present invention also makes it unnecessary to provide complicated adjusting mechanism for varying the elevation of the contact bars 22, since the chains 24 which are of fixed length may be readily tilted to any desired angle in order to effect such elevation variation. The improved animal trainer has gone into highly satisfactory and successful commercial use and is capable of effectively training various types of animals.

It should be understood that it is not desired to limit this invention to the exact details of construction or to the precise mode of operation, herein specifically shown and described, for various modifications within the scope of the appended claims may occur to persons skilled in the art.

I claim:

1. An animal trainer for use in a stall having a refuse collecting gutter rearwardly of the animal housing space, comprising, a bare electric current conducting wire disposable above and to span the stall, an elongated current conducting bar locatable in proximity to and to span the back of an animal standing within said stall and having a series of sharp animal contacting formations along its lower portion, a pair of current conducting flexible elements each having its lower end portion attachable directly to an end of said bar, and a friction clip slidably connecting the upper end portion of each element with the wire, said clips being relatively movable along the wire to vary the elevation of said bar.

2. An animal trainer for use in a stall having a refuse collecting gutter rearwardly of the animal housing space, comprising, a bare electric current conducting wire located above and spanning the stall, an elongated electric current conducting bar located beneath said wire and also spanning the stall above and in proximity to an animal standing in the stall, said bar having its lower edge provided with a series of V-shaped animal contacting formations formed to merely penetrate the animal's hairy coat, an electric current conducting bar suspension chain directly pivotally attached at its lower extremity to each of the opposite ends of said bar, and a friction clip pivotally attached to the upper extremity of each of said chains, said clips clampingly engaging said wire but being relatively slidable along the wire to vary the elevation of said bar.

References Cited in the file of this patent

UNITED STATES PATENTS

| | | |
|---|---|---|
| 1,512,610 | Kolb | Oct. 21, 1924 |
| 2,428,875 | Hantz | Oct. 14, 1947 |

FOREIGN PATENTS

| | | |
|---|---|---|
| 77,323 | Denmark | Mar. 29, 1954 |